(12) United States Patent
Richart

(10) Patent No.: US 6,946,087 B2
(45) Date of Patent: Sep. 20, 2005

(54) RESIN MIXTURES AND DISPERSIONS

(76) Inventor: Douglas S. Richart, 6 Golfview La., Reading, PA (US) 19606

(*) Notice: Subject to any disclaimer, the term of this patent is extended or adjusted under 35 U.S.C. 154(b) by 758 days.

(21) Appl. No.: 09/726,750

(22) Filed: Nov. 30, 2000

(65) Prior Publication Data

US 2001/0000417 A1 Apr. 26, 2001

Related U.S. Application Data

(63) Continuation-in-part of application No. 09/173,897, filed on Oct. 16, 1998, now abandoned.

(51) Int. Cl.[7] .............................................. B29B 15/00
(52) U.S. Cl. .......................... 264/5; 264/129; 523/340; 524/904; 427/372.2
(58) Field of Search ........................... 264/5, 129, 349; 523/340; 524/904; 427/372.2

(56) References Cited

U.S. PATENT DOCUMENTS 5,290,603 A * 3/1994 Nielsen et al. .............. 427/421
5,548,004 A * 8/1996 Mandel et al. .............. 523/342
5,766,522 A * 6/1998 Daly et al. .................... 264/13

* cited by examiner

Primary Examiner—Mary Lynn Theisen
(74) Attorney, Agent, or Firm—Richard O. Church

(57) ABSTRACT

The invention discloses a method by which a fluid heat reactive resin system is formulated below the melting point of the resin. This permits the application of coatings and the formation of shapes and powders from the fluid heat reactive system. Liquefied gases are used to solvate resins so that curing agents, hardeners, pigments and flow control agents, and especially curing agents which are too reactive to be mixed with the resins above the melting point of the resins may be dispersed in the resins.

After dispersion, the fluid heat reactive resin system remains in a deformable state under ambient conditions for a transient processing time. The transient processing time is established and maintained by the inclusion of plasticizers and high boiling solvents in the heat reactive resin system.

13 Claims, No Drawings

US 6,946,087 B2

RESIN MIXTURES AND DISPERSIONS

CROSS REFERENCE TO RELATED APPLICATIONS

This application is a continuation-in-part of my application Ser. No. 09/173,897 filed on 16 Oct. 1998 now abandoned.

BACKGROUND OF THE INVENTION

This invention relates to the formulation and configuration of a heat reactive resin system at temperatures below the melting temperature ($T_m$) of the base resin in the system. More particularly the invention relates to the preparation of coating powders, the application of coatings and the formation of shapes from fluid heat reactive resin systems and curing them at low temperatures.

1. Definitions

As used in the specification and the attached claims, the following terms are defined as follows.

a. "Base resin" or the unmodified term "resin," means a neat, heat reactive resin to which no curing agents have been added.

b. "Resin mixture" means a simple mixture of resins and other ingredients such as curing agents, pigments, additives and the like before dispersing the other ingredients in resins.

b. "Normally solid" is used in the context of ambient room conditions.

c. "Heat reactive resin systems" means resins in which curing agents, catalysts, pigments, additives, fillers and the like have been dispersed.

d. "Slowly," when used to modify how the pressure in a pressure vessel is relieved, indicates that the pressure is relieved in a controlled manner that avoids a significant formation of a foam.

e. "Transient processing time" is the elapsed time that a heat reactive resin system discharged from a pressure vessel remains fluid enough to be configured.

f. "Low temperature curing" means the cure of a heat reactive resin system is carried out at a temperature below about 140° C.

g. "Supercritical range" means the conditions of temperatures and pressures at which liquefiable gases are approaching, at or somewhat above their supercritical point. Note that this is consistent with prior usage as illustrated, for example, with the definition of "supercritical fluid" as used in U.S. Pat. No. 5,027,742 at line 23 of column 4, the teachings of which patent are incorporated herein by reference as they relate to liquefiable gases and supercritical fluids.

2. Prior Art Discussion

Commercially important materials such as paints, adhesives, molding compounds, coating powders, toners, pharmaceuticals are commonly prepared from polymers in which curing agents, pigments, fillers and the like are dispersed. The dispersions may prepared in liquid dispersing equipment such as ball mills, media or bead mills, and in high shear mixers such as a Cowles dissolver, colloid mills and the like while the polymers are dissolved in a solvent. Dispersion processes are normally carried out at atmospheric temperatures and pressures.

If the solid ingredients are dispersed in polymers such as rubber, plastics or resins, the polymers are processed in a plastic or molten state. Typical apparatuses for carrying out such dispersions are Banbury Mixers, 2-roll mills and extruders of all types. In these devices the polymer is heated above its softening temperature by external heating, by functional heating of the plastic mass, or by the dissipation of mechanical action (work.) Even low melting resins such as those used in the preparation of thermosetting coating powders or electrostatic toners, require processing temperatures of at least about 100° C. and most usually significantly higher temperatures. If the curative in the thermosetting resin systems are designed for low temperature curing, they are, at least, partially reactive at the normal extrusion temperatures e.g. 100° C. or more.

Thermosetting polymer mixtures are conventionally prepared by thoroughly dry mixing resinous binders with components such as curing agents, additives, pigments, fillers, catalysts, etc. and then dispersing the ingredients above the melting point of the resinous binders. This is commonly referred to as "melt mixing." A description and examples of melt mixing can be found in the Kirk-Othmer Encyclopedia of Chemical Technology, Volume 6, starting on page 635 (1993).

In the preparation of heat reactive thermosetting resin systems such as are useful as coating powders, adhesives and the like, it is often desirable to formulate reactive resin systems that cure at relatively low temperatures or rapidly at higher temperatures. Care must be taken when the reactive resins mixtures are dispersed above their melting points to avoid premature reactions that yield gelled or partially gelled products. Even if premature reactions do not result in partially gelled products, the curing reaction, once started, may continue at ambient temperatures resulting in cross linking reactions and reduced flow of the dispersions when used in coating processes. Eventually, the reaction will proceed until the flow is impaired to the extent that a continuous film can no longer be formed. The ability of a thermosetting composition to maintain good application characteristics over a long period of storage is referred to as "storage stability" or sometimes "shelf life."

There are many applications where powder coatings cannot be used because of the high temperatures required to melt and cure the coating in a reasonable time, e.g. 30 minutes or so. Most of these applications involve coating temperature sensitive substrates such as plastics, various types of wood or engineered wood products such as particle board, oriented strand board (OSB) and medium density fiberboard (MDF) and composite assemblies containing rubber, plastics electrical insulation, etc. In order to utilize reactive curing agents necessary for low temperature curing thermosetting coatings, it is necessary to process them at temperatures below which significant reaction between the resin and the curative occurs.

Melt mixing processes are made more difficult if the resins have significantly differing melting points and variations in melt viscosity. Melt mixing temperatures must be sufficiently high to melt the resin and form a useful and processable melt viscosity but, on the other hand, the temperatures must not be so high as to lower the viscosity of additives to a point at which good dispersions can not be achieved. That is to say that melt mixing is most effective when the viscosities of the melted materials are of a similar magnitude. For example, when melt mixing or dispersing crystalline or partially crystalline resins, additives, catalysts, waxes, etc. with amorphous polymers, the lack of homogeneity of the melt viscosities can result in micro defects in coatings applied from the dispersion. Micro defects lead to haze and loss of clarity. This can diminish the utility of coating materials in demanding applications such as automotive finishes in which a high level of gloss and distinctiveness of image are highly desired.

Gaseous fluids are commonly used in extraction and impregnation processes. Exemplary of this technology are U.S. Pat. Nos. 3,969,196, 4,061,566, 4,308,200 and others.

In U.S. Pat. No. 4,598,006, thermoplastic polymers are impregnated with fragrances, pest control agents and pharmaceuticals dissolved in a volatile swelling agent for the polymer, where the volatile swelling agent is a gas maintained above or near supercritical conditions. When the pressure or temperature is reduced, the gas diffuses out of the thermoplastic polymer but the impregnated material remains in the polymer. The reduction in temperature or pressure is carried out carefully so the physical appearance of the polymer is not altered.

U.S. Pat. No. 4,820,752 discloses a method of infusing an additive into a polymer using a compressed fluid which is normally a gas at room temperature. The fluid may be in a liquid or gaseous state if the operating environment at which the process is being carried out is below or equal to the critical temperature of the fluid. If the operating environment is above the critical temperature of the fluid, the process must be carried out in the liquid state. The fluid and the additive are chosen so that the additive has a degree of solubility in the polymer into which it is to be infused and so that the solution of fluid and additive has a degree of solubility in the polymer and is capable of swelling the polymer. The polymer is swollen at least 2% by volume and preferably 5% by volume by the compressed normally gaseous fluid used. Carbon dioxide is the preferred fluid.

In both of these patents, the form and appearance of the polymer is not significantly altered but the additive must be soluble in the supercritical fluid. If the additive is not soluble in the supercritical fluid, it cannot be imbibed by, or carried into, the structure of the polymer. For a more complete description of the solvation of resins in supercritical fluids, see U.S. Pat. No. 4,734,227 whose teachings are incorporated herein by reference.

U.S. Pat. No. 5,708,039 describes a method for producing a coating powder by dissolving the ingredients in a combination of an active solvent and supercritical carbon dioxide. The solution is sprayed from the supercritical solution which reportedly forms generally spherical particles. The remaining solvent is subsequently removed by evaporation under vacuum.

The use of liquefied gasses in the supercritical state for processing resin mixtures is described in U.S. Pat. No. 5,399,597. Thermosetting resin mixtures are dispersed in a supercritical gas, preferably supercritical carbon dioxide, in a first pressure vessel. The dispersion process is carried out by agitating the resin mixture with the supercritical carbon dioxide until the desired degree of dispersion is obtained. The dispersion of thermosetting resin and supercritical carbon dioxide is then atomized through hydraulic spray nozzles into a second vessel maintained at a lower pressure. A conglomerate of flake-type and rounded particles is reported to be formed. Spraying the resin mixture and carbon dioxide directly from the supercritical state to form powder particles is a critical part of the patented process and must be observed in all cases. It is taught that none of the ingredients in the resin mixture should be soluble in the supercritical carbon dioxide to avoid volatilization (separation) when the resin mixture is sprayed from the supercritical state.

A process is disclosed in U.S. Pat. No. 5,975,874 for compounding thermosetting coating powders in an extruder. A supercritical fluid is utilized in the extruder to reduce the viscosity of a coating powder precursor although the patent does not discuss how the supercritical fluid is contained within the extruder. It is taught that coating powders are made from the extruded materials.

U.S. Pat. No. 5,981,696 is of interest for its disclosure of dissolving base resins and a plurality of hardeners in an inert low molecular weight compound while the compound is maintained above its critical temperature and pressure. The resins and hardeners are processed within a pressure vessel and, it is said, coating powders may be formed by spraying the solution into a region of lower pressure. Alternatively, the patent teaches that the pressure may be relieved in a time-dependent manner. In this later case, the reactor is described as containing a solid foam after a normal pressure is reached. The foam is described as consisting of individual particles which adhere to each other but which can be separated into individual particles.

OBJECTS OF THE INVENTION

It is an object of this invention to provide a method for compounding heat reactive resin systems at temperatures below the melting point of the base resins.

Another object of this invention is to enable the utilization of lower temperature curing agents which would be too reactive if compounded above the melting point of the base resin.

And yet another object of the invention is to utilize low melting, crystalline—or even liquid ingredients—in the formulation of fluid heat reactive resin systems that can be applied directly to a substrate and subsequently cured.

It is a further object of the invention to prepare a fluid heat reactive resin system that may be configured at ambient temperatures.

Still a further object of the invention is to compound heat reactive resins systems which can be cured at lower temperatures than can current resin systems compounded above the melting point of the base resin.

A further object of this invention is to provide a method for coating a substrate with a fluid heat reactive resin system directly upon discharge from the reactor vessel without first converting the resin system to a powder and subsequently applying the powder to the substrate.

A further object of the invention is to provide a method for coating a substrate with a fluid heat reactive resin system which does not materially distort or degrade the substrate.

And yet a further object of the invention is to provide a method for configuring a shape from a fluid heat reactive resin system and curing the shape using low temperature curing.

And yet a further object of the invention is reduce the cycle time of injection molding shapes from heat reactive resin systems.

And yet a further object of the invention is to prepare heat reactive resin system that is mobile at temperatures below the melting point of the base resin.

SUMMARY OF THE INVENTION

These, and other objects of this invention are achieved by solvating a resin in a liquified gas in the supercritical range, mixing a curing agent and other desired additives with the solvated resin in a pressure vessel, depressurizing the vessel slowly to avoid significant foaming, and discharging a fluid heat reactive resin system. The fluid heat reactive resin system may be configured into a shape or applied as a coating to a substrate by spreading, for example, and cured at a low temperature. Alternatively, the fluid heat reactive resin system may be spread in a thin sheet to allow the residual liquified gas and solvent/plasticizer to escape more rapidly and subsequently pulverize the non-solvated, now solid, heat reactive resin system, for application by conventional powder coating methods; or, it can be agitated during solidification to form a powder directly.

The preferred liquified gas is carbon dioxide but other gases such as sulfur dioxide, low boiling hydrocarbons and their derivatives and the like can prove useful. After the dispersion has been completed, agitation has ceased and the solvated heat reactive system has separated from the liquid phase, the liquified gas is slowly depressurized from the top of the vessel in a manner that avoids or minimizes the formation of foam. Surprisingly, the heat reactive resin system can be maintained in a fluid state for a significant period of time after liquified gas has been relieved from the vessel which permits discharging the resin system from the pressure vessel and manipulating it as by pumping, shaping, dispersing, spraying, calendaring, dip coating, extruding, etc. after discharge. The elapsed time that the heat reactive resin system remains fluid and is capable of manipulation is here referred to as the "transient processing time"—which can vary from several minutes to several hours depending on the temperature of the system, the surface to volume ratio into which the resin system is configured and the amount of high boiling solvents or plasticizers included in the system.

DETAILED DESCRIPTION OF THE INVENTION

A standard pressurized reactor equipped with means for heating, cooling and mixing is suitable for carrying out the process of this invention. The ingredients required to form a heat reactive resin system are charged to the vessel. Suitable ingredients include the base resin, curing agents, accelerators and other additives such as pigments to provide the desired end use properties. Preferred resins that are commonly included in the formulation of coating powders are described, for example, in the Kirk-Othmer reference, supra, in *Powder Coatings Chemistry and Technology* by T. A. Misev, J. Wiley & Sons (1991), chapters 2–4 and in the *Science of Powder Coatings—Chemistry, Formulation and Application*, Volume 1, by D. A. Bate, published by SITA Technology (1990) Chapter II and III. In general, these resins have molecular weights ($M_n$) in a range of about 500–100,000 but mostly in a range of about 1,200–10,000. To maintain flowability in storage, the preferred Tg of the resins is usually greater than about 40° C. and preferably above about 50°. Resins useful in the practice of this invention are most commonly epoxy resins, polyester resins, both hydroxyl and acid functional, amorphous and semicrystalline types as described in PCT WO 91/14745, acrylic resins both hydroxyl and acid functional, and combinations thereof. Thermoplastic and thermosetting resins can be used in combination. In the case of thermosetting resins, suitable curing agents include dicyanamides and derivatives, amines, imidizoles, phenolic resins, carboxyl functional polyester or acrylic resins for the epoxy resins, blocked isocyanate, uretdione and amino resins for hydroxyl functional polyester or acrylic resins, dibasic aliphatic acids or polymeric polyanhydrides for glycidyl functional acrylic resins and triglycidyl isocyanurate (TGIC) and other glycidyl functional resins and compounds and hydroxyalkyl amide curatives for acid functional polyester and acrylic resins.

Additives are often included in the heat reactive resin systems for special purposes. These may include flow control additives, degassing additives, surface active agents, charge control additives (especially in the case of electrostatic toners) mar and slip additives, heat and light stabilizers, waxes, gloss control additives and many others. Pigments and inert extenders such as barium sulfate or calcium carbonate are sometimes useful.

It has been found that the transient processing time can be materially extended if minor amounts, e.g. 10% or less by weight, of high boiling solvents or plasticizers are included in the heat reactive resin system.

After all the ingredients have been charged to the reactor, it is sealed and the liquefied gas introduced. Agitation can be started as soon as the resin mixture is wet out by the liquefied gas or delayed until the vessel is filled with the liquefied gas and adjusted to the desired conditions of temperature and pressure. The ratio of liquefied gas to the resin mixture can vary over a wide range. As low as 10% (all percentage are given in the specification and clams by weight unless otherwise noted) resin mixture and 90% liquefied gas to as high as 80% resin mixture and 20% liquefied gas are useful in the practice of the invention. Quite generally, a ratio of about 20–60% resin mixture to gas is a convenient ratio.

If the gas is $CO_2$, a range in temperature from ambient temperature to about 160° C. is useful but a range of from about 30° C. to 150° C. and more preferably a range of about 30° C. to about 90° C. is preferred. With regard to pressure, it must be high enough to maintain the gas in a liquefied state. Pressures of from about 300 psi to about 20,000 psi may be utilized. When the gas is $CO_2$ pressures of about 800 psi to about 6,500 psi are useful and more preferably are in a range of from about 1000 psi to 5000 psi.

The resin mixture is mixed with the liquefied or supercritical carbon dioxide until the resin is solvated. This occurs in a relatively short period of time, or about 5–30 minutes, after the desired conditions of temperature and pressure are attained. The ingredients in the resin mixture can be dispersed by continuing to mix them in the pressurized vessel. Alternately, the dispersion can be carried out after the vessel has been essentially depressurized by removing the liquefied carbon dioxide and causing the liquefied solvated resin mixture to flow through a media mill, roll mill, colloid mill or other suitable dispersion device while at atmospheric pressure. Sufficient gas pressure can be retained in the reactor to force the heat reactive resin through the dispersion device or a pump can be used.

In one embodiment of this invention, two pressure vessels are used in tandem in a semicontinuous process. After the resin mixture is mixed with the supercritical $CO_2$ and a heat reactive resin system is established, the liquefied $CO_2$ is allowed to separate from the heat reactive resin system by stopping the agitation. The supernatant $CO_2$ is transferred to a second pressure vessel into which the ingredients of a resin mixture have already been added thereby leaving the solvated fluid heat reactive resin system in the first vessel at atmospheric pressure or at a pressure sufficiently low to aid in removal of the fluid heat reactive resin system from the vessel. While the fluid heat reactive resin system is discharging from the first vessel, a solvated resin mixture is formed in the second vessel. When the first vessel is fully discharged, it is charged with a new resin mixture, sealed and filled with some of the $CO_2$ from the second reactor. The second reactor is then discharged. This procedure is sequentially repeated to reduce consumption of $CO_2$ and to yield a relatively continuous stream of fluid heat reactive resin systems.

The following example is given to illustrate the practice of this invention. However, it should not be construed as limiting since many variations of the procedure will be apparent to those skilled in the art.

EXAMPLE

The following materials were charged to a 1 liter pressurized stirred reactor equipped with a turbine agitator (Pressure Products—LC Series)

Epoxy Powder (1) 250 g

Aluminum Paste (2) 13.5 g (1) The composition of the epoxy powder is as follows:

Epoxy resin (a) 48.0

DEH 85 (b) 15.4

B-68 (c) 0.9

Resiflow P-67 (d) 0.7

$TiO_2$ 24.0

Calcium Carbonate 11.0

(a) Equivalent Epoxy Weight ca. 750—melting point 85–92° C.

(b) Phenolic Curative—Dow Chemical—melting point 83–90° C.

(c) Special Hardener—Huls (d) Acrylic Flow Control Agent—Estron Chemical (2) Aluminum paste, SBC-516-20Z from Silberline manufacturing 55.4 wt % aluminum flake, 44.6 wt % mineral spirits. In this Example the mineral spirits were present in the heat reactive resin system in an amount equal to 2.3 wt % (13.5×0.446/263.5) This presence of mineral spirits is most important. It is believed that the mineral spirits act as a plasticizer or a high boiling solvent for the resin and is responsible for establishing and extending the transient processing time.

Components 1 and 2 were dry mixed and added to the reactor which was then sealed. An agitator in the reactor was started at 400 rpm and liquefied carbon dioxide was allowed to flow from a pressurized cylinder into the reactor while the reactor was being heated. After 5 minutes, the vessel was full of carbon dioxide and the pressure gauge registered 800 psi. While carbon dioxide continued to flow from the cylinder, the pressure relief valve of the reactor was opened slightly to allow a flow rate of 5 liters per minute. After seven minutes, the temperature had reached 64° C. and the agitator started to show difficulty stirring as judged by the generation of noise. The protective shield which covers the agitator motor, agitator drive, and agitator pulley was removed and it was noted the agitator drive belt showed signs of instability, i.e., vibration. After 12 minutes, the agitator drive belt showed further signs of instability and the speed was increased to 600 rpm. It is believed that the instability of the agitator is due to the viscous nature of the solvated resin mixture. At this time, the temperature registered 64° C. After a further 5 minutes, 17 minutes total, the temperature remained constant at 64° C., the pressure at 800 psi, flow rate 5 liters per minute, and the agitation stable at 600 rpm. After 20 minutes, the temperature had increased to 69° C., the agitator speed read 567 rpm, the pressure and flow rate remained constant. After 30 minutes, the temperature read 71° C. and the agitator speed 580 rpm. After 33 minutes, the flow of carbon dioxide was stopped and the vessel allowed to depressurize at the rate of 5 liters per minute. After 40 minutes, the pressure had decreased to 400 psi and the agitator speed to 500 rpm (with no changes to the speed regulator). After 45 minutes, the pressure gauge read <100 psi and the agitator registered 284 rpm with an increasing level of instability. After 48 minutes, the vessel was completely depressurized. The temperature was 73° C. The vessel was opened in five minutes. The now visible contents had the appearance of an unfoamed resin solution. The unfoamed fluid heat reactive resin system was scraped from the agitator blades and scooped out of the pressure vessel. After about five minutes after discharge from the vessel, the fluid heat reactive resin system started to solidify, although it was still tractable. Ten minutes after depressurization, the resin system was still fluid, but had the consistency of putty and flowed only under force. After about 30 minutes, the resin system was essentially solid especially in thinner sections, i.e., less than about 5 mm. Thick sections were still slightly soft.

There is no disclosure in the prior art which suggests that a fluid heat reactive resin system prepared as above described can be configured as into a shape or applied as a coating to a substrate at atmospheric pressures. In this later regard, the coating can be applied to the substrate as by brushing, dipping, flow coating , calendaring, spraying or the like. The coating can then be cured by low temperature curing. If reactive, low temperature curing agents are used to prepare the heat reactive resin system, it enables the application of a coating to beat sensitive substrates, such as plastics, paper or wood, without thermally degrading or deforming the substrate. Regardless of whether low temperature acting or more conventional curative are used in the preparation of the resin system, the system can be readily converted to a powder suitable for application by conventional powder coating application methods.

The fluid heat reactive resin system can also be molded into a desired shape as in injection or rotational molding.

What is claimed is:

1. A method by which a fluid heat reactive resin system is formulated and configured below the melting temperature of a base resin comprising the steps of:

introducing the base resin and a curing agent for the resin into a pressure vessel;

introducing a liquefiable gas and a plasticizer or high boiling solvent into the pressure vessel;

adjusting the temperature and pressure within the vessel to the supercritical range of the liquefiable gas;

solvating the resin and dispersing the curing agent;

slowly reducing the pressure within the vessel to essentially atmospheric pressure;

discharging a fluid heat reactive resin mixture from the vessel and maintaining the heat reactive resin in a fluid state for a transient processing time.

2. A method according to claim 1 wherein the discharged fluid heat reactive resin system is coated over a substrate during the transient heat processing time.

3. A method according to claim 1 wherein the fluid heat reactive resin system is converted into a powder.

4. A method according to claim 2 wherein the fluid heat reactive resin is cured at low temperatures below about 140° C.

5. A method according to claim 1 wherein other ingredients selected from the class consisting of curing agents, pigments, additives ore introduced into the pressure vessel and dispersed in the solvated resin.

6. A method according to claim 1 wherein the fluid heat reactive resin is configured by calendering.

7. A method according to claim 1 wherein the fluid heat reactive resin is configured in a mold.

8. A process according to claim 1 in which enough pressure is maintained in the vessel when the pressure is reduced to aid in discharging the fluid heat reactive resin.

9. A process according to claim 1 wherein the resin has a molecular weight ($M_n$) in the range of 400–100,000.

10. A process according to claim 1 wherein the gas is carbon dioxide.

11. A process according to claim 1 wherein two pressure vessels are used in tandem, alternately transferring the liquefied gas from one vessel to the other.

12. A method according to claim 1 in which the plasticizer or high boiling solvent is mineral spirits.

13. A method a according to claim 12 in which the plasticizer or mineral spirits is present in an amount less than 10% by weight.

* * * * *